US011679592B2

(12) United States Patent
Miyasaka et al.

(10) Patent No.: US 11,679,592 B2
(45) Date of Patent: Jun. 20, 2023

(54) RECORDING APPARATUS

(71) Applicant: SEIKO EPSON CORPORATION, Tokyo (JP)

(72) Inventors: Haruki Miyasaka, Matsumoto (JP); Shintaro Miyamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/909,276

(22) Filed: Jun. 23, 2020

(65) Prior Publication Data
US 2020/0406624 A1 Dec. 31, 2020

(30) Foreign Application Priority Data

Jun. 26, 2019 (JP) .............................. JP2019-118849

(51) Int. Cl.
*B41J 2/17* (2006.01)
*B41J 29/393* (2006.01)

(52) U.S. Cl.
CPC ........... *B41J 2/1721* (2013.01); *B41J 29/393* (2013.01); *B41J 2002/1742* (2013.01)

(58) Field of Classification Search
None
See application file for complete search history.

(56) References Cited

U.S. PATENT DOCUMENTS

| 7,567,357 B2* | 7/2009 | Kato ........................ B41J 2/165 347/11 |
| 8,992,002 B2 | 3/2015 | Yamamoto |
| 9,315,031 B2* | 4/2016 | Takeuchi ............... B41J 29/023 |
| 9,483,014 B2 | 11/2016 | Fujikawa |
| 10,035,362 B2 | 7/2018 | Jimbo |
| 2005/0062794 A1* | 3/2005 | Kanamitsu ............. B41J 2/1721 347/31 |
| 2013/0050373 A1 | 2/2013 | Yamamoto |
| 2014/0203694 A1* | 7/2014 | Watanabe ............. E05F 1/1253 312/319.2 |
| 2015/0035914 A1 | 2/2015 | Takeuchi et al. |
| 2015/0139686 A1 | 5/2015 | Takenoshita et al. |
| 2015/0153700 A1 | 6/2015 | Fujikawa |
| 2017/0120617 A1* | 5/2017 | Matsumura .............. B41J 29/38 |
| 2017/0129261 A1 | 5/2017 | Jimbo |
| 2018/0093511 A1* | 4/2018 | Taketsugu ................ B41J 29/13 |

FOREIGN PATENT DOCUMENTS

| CN | 104080614 | 10/2014 |
| JP | 2013-049216 | 3/2013 |
| JP | 2015-096917 A | 5/2015 |
| JP | 2015-106064 | 6/2015 |
| JP | 2016-090641 | 5/2016 |
| JP | 2017-087534 | 5/2017 |

* cited by examiner

*Primary Examiner* — Alejandro Valencia
(74) *Attorney, Agent, or Firm* — Workman Nydegger

(57) ABSTRACT

A recording apparatus includes: an apparatus main body having a recording unit that performs recording onto a recording medium; and a unit body which is provided on an upper side of the apparatus main body, and forms a plurality of boundaries between the unit body and a top of the apparatus main body, wherein a recess that receives liquid entering through a gap is formed for each of the plurality of boundaries.

10 Claims, 19 Drawing Sheets

RECORDING APPARATUS

The present application is based on, and claims priority from JP Application Serial Number 2019-118849, filed Jun. 26, 2019, the disclosure of which is hereby incorporated by reference herein in its entirety.

BACKGROUND

1. Technical Field

The present disclosure relates to recording apparatuses that perform recording onto a recording medium.

2. Related Art

Examples of the recording apparatuses that perform recording onto a recording medium include printers. JP-A-2015-096917 discloses an image forming apparatus including a top cover that forms a top of an apparatus main body in order to prevent water from entering the apparatus main body, and an openable cover rotatably supported with respect to the apparatus main body, the openable cover having an edge which is aligned with an edge of the top cover when the openable cover is at a closed position, wherein a groove is provided on the edge of the top cover and the edge of the openable cover. According to this image forming apparatus, even if water enters through a boundary between the edge of the top cover and the edge of the openable cover, the groove receives the water and prevent the water from entering the apparatus main body.

In the configuration described in JP-A-2015-096917, the groove that receives water extends to the outside of a frame that supports an image forming unit so that the received water flows along the groove and is discharged to the outside of the apparatus. That is, the above groove extends to traverse the apparatus in the left-right direction. However, in the configuration in which a plurality of boundaries are formed on the top of the apparatus, a groove that traverses the apparatus in plan view is required to be provided for each of the plurality of boundaries. Such a configuration may not be adopted in relation to other components.

SUMMARY

According to an aspect of the present disclosure, a recording apparatus includes: an apparatus main body having a recording unit that performs recording onto a recording medium; and a unit body which is provided on an upper side of the apparatus main body, and forms a plurality of boundaries between the unit body and a top of the apparatus main body, wherein a recess that receives liquid entering from the boundary is formed for each of the plurality of boundaries.

DESCRIPTION OF EXEMPLARY EMBODIMENTS

Figure 1:
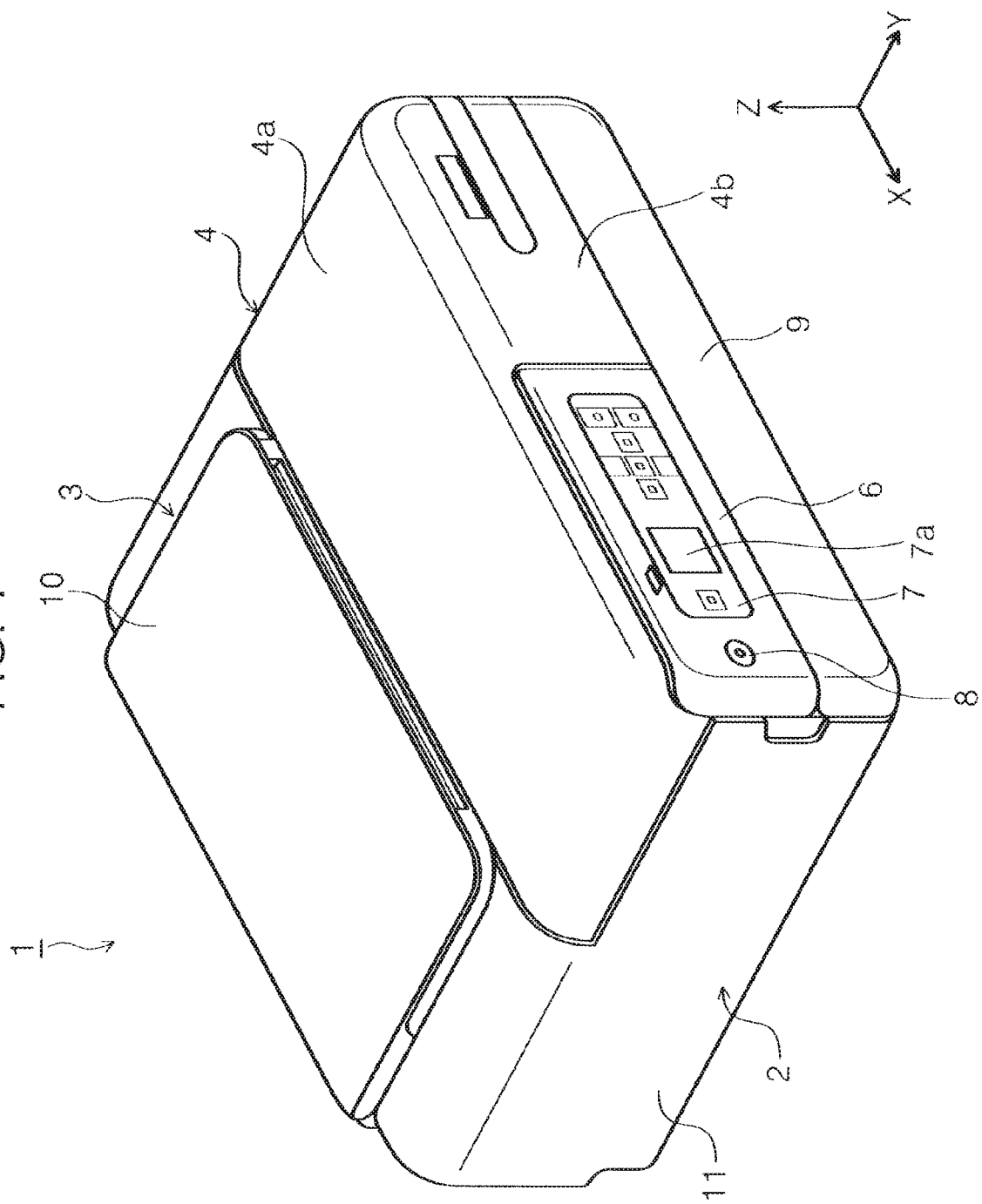
FIG. 1 is an appearance perspective view of a printer with an openable cover and a scanner cover being closed.

The present disclosure will now be schematically described. A recording apparatus according to a first aspect includes: an apparatus main body having a recording unit that performs recording onto a recording medium; and a unit body which is provided on an upper side of the apparatus main body, and forms a plurality of boundaries between the unit body and a top of the apparatus main body, wherein a recess is formed for each of the plurality of boundaries so as to receive liquid entering through a gap formed at the boundaries.

According to this aspect, the recording apparatus includes: an apparatus main body having a recording unit that performs recording onto a recording medium; and a unit body which is provided on an upper side of the apparatus main body, and forms a plurality of boundaries between the unit body and a top of the apparatus main body, wherein a recess is formed for each of the plurality of boundaries so as to receive liquid entering through a gap formed at the boundaries. Accordingly, it is not necessary to provide a groove that traverses the apparatus in plan view for discharging the liquid to the outside of the apparatus, and, in the configuration in which a plurality of boundaries are formed on the top of the apparatus, it is possible to prevent liquid from flowing into an undesired position in the apparatus even if the liquid enters through any of the gaps formed at the plurality of the boundaries.

According to a second aspect, in the recording apparatus of the first aspect, the unit body is a document reading unit having a reading section that reads a document and a document transport section that transports the document to the reading section. According to this aspect, in a configuration in which the unit body is a document reading unit, an advantageous effect of the above first aspect is achieved.

According to a third aspect, in the recording apparatus of the second aspect, the plurality of boundaries include: a first boundary located on a first side in a direction intersecting a document transport direction of the document transport section relative to the unit body, the first boundary extending in the document transport direction; a second boundary located on a second side that opposite to the first side in the document transport direction relative to the unit body, the second boundary extending in the document transport direction; and a third boundary located upstream in the document transport direction relative to the unit body, the third boundary extending in a direction intersecting the document transport direction, a first recess that corresponding to a gap formed at the first boundary, a second recess that corresponding to a gap formed at the second boundary, and a third recess that corresponding to a gap formed at the third boundary.

According to a fourth aspect, in the recording apparatus of the third aspect, a hole for allowing liquid to drop down is formed in the third recess. According to this aspect, since a hole for allowing liquid to drop down is formed in the third recess, it is possible to prevent liquid from overflowing from the third recess when the liquid exceeding a maximum storage amount of the third recess enters.

According to a fifth aspect, in the recording apparatus of the fourth aspect, a bottom of the third recess includes an inclined surface extending downward toward the hole. According to this aspect, since a bottom of the third recess includes an inclined surface extending downward toward the hole, the liquid entering the third recess can be appropriately guided to the hole.

According to a sixth aspect, in the recording apparatus of the fourth or fifth aspect, the recording unit is formed of a recording head that performs recording by ejecting ink onto a recording medium, the apparatus main body includes a support member that supports a recording medium at a position facing the recording unit, the support member has an ink receiver that receives ink ejected from the recording head, and the ink receiver receives liquid that drops from the hole provided in the third recess. According to this aspect, since the ink receiver has a function as a liquid receiver that receives liquid entering through a gap formed at the boundary in addition to the function of receiving ink ejected from the recording head, the cost for the apparatus can be reduced.

According to a seventh aspect, in the recording apparatus of the sixth aspect, the ink receiver has an ink absorber that absorbs ink. According to this aspect, the ink absorber can prevent liquid from overflowing from the ink receiver when the apparatus is tilted.

According to an eighth aspect, in the recording apparatus of the third aspect, the apparatus main body includes a liquid receiver that receives liquid, and a hole for allowing liquid to drop down is formed in a region where the second boundary and the third boundary intersect each other, and the liquid receiver is provided under the hole. According to this aspect, the liquid receiver can prevent the inside of the apparatus from being stained with the liquid. Further, when a live part is provided, it is possible to prevent the liquid from adhering to the live part, which reduces a failure of the apparatus.

According to a ninth aspect, in the recording apparatus of the eighth aspect, a circuit board is provided under the liquid receiver. According to this aspect, the liquid receiver can reduce adhesion of liquid to the circuit board, which reduces a failure of the apparatus.

According to a tenth aspect, in the recording apparatus of the third aspect, the apparatus main body includes the recording unit, and a carriage that moves in a direction intersecting the document transport direction, the carriage has a home position at an end of a movable region, the recording unit is formed of a recording head that performs recording by ejecting ink onto a recording medium, an ink absorber that absorbs ink is provided at the home position of the carriage, and a hole for allowing liquid to drop down is formed in a region where the first boundary and the third boundary intersect each other, and the ink absorber is located under the hole. According to this aspect, since the ink absorber has a function of absorbing liquid entering through a gap formed at the boundary in addition to the function of absorbing ink ejected from the recording head, the cost for the apparatus can be reduced.

According to an eleventh aspect, in the recording apparatus of the first or second aspect, a hole is formed in the recess, and liquid entering through a gap formed at the boundary is guided to the liquid receiver that receives liquid through the hole. According to this aspect, since a hole is formed in the recess, and liquid entering through a gap formed at the boundary is guided to the liquid receiver that receives liquid through the hole, it is possible to prevent liquid from overflowing from the recess when the liquid exceeding a maximum storage amount of the recess enters.

According to a twelfth aspect, in the recording apparatus of the eleventh aspect, the liquid receiver has a liquid absorber that absorbs liquid. According to this aspect, since the liquid receiver has a liquid absorber that absorbs liquid, it is possible to prevent liquid from overflowing from the liquid receiver when the apparatus is tilted.

According to a thirteenth aspect, the recording apparatus of the third aspect further includes: a power supply unit provided at a position that overlaps the first boundary in plan view; and a liquid guiding member that guides liquid entering from a gap formed at the first boundary in a direction away from the power supply unit. According to this aspect, since the recording apparatus includes: a power supply unit provided at a position that overlaps the first boundary in plan view; and a liquid guiding member that guides liquid entering from a gap formed at the first boundary in a direction away from the power supply unit, it is possible to prevent adhesion of liquid entering through a gap formed at the first boundary to the power supply unit.

According to a fourteenth aspect, in the recording apparatus of the thirteenth aspect, the power supply unit includes a plug insertion part, and the liquid guiding member includes a wall that regulates a flow of liquid to the plug insertion part. According to this aspect, since the power supply unit includes a plug insertion part, and the liquid guiding member includes a wall that regulates a flow of liquid to the plug insertion part, it is possible to prevent liquid from flowing into the plug insertion part.

A recording apparatus according to a fifteenth aspect includes: an apparatus main body having a recording head that performs recording by ejecting ink onto a recording medium; and a unit body which is provided on an upper side of the apparatus main body, and forms a plurality of boundaries between the unit body and a top of the apparatus main body, wherein the apparatus main body includes a support member that supports a recording medium at a position facing the recording head, the support member has an ink receiver that receives ink ejected from the recording head, and liquid entering through a gap formed at the boundary is guided to the ink receiver and received by the ink receiver.

According to this aspect, since liquid entering through a gap formed at the boundary is guided to the ink receiver and received by the ink receiver, it is not necessary to provide a groove that traverses the apparatus in plan view for discharging the liquid to the outside of the apparatus, and, in the configuration in which a plurality of boundaries are formed on the top of the apparatus, it is possible to prevent liquid from flowing into an undesired position in the apparatus even if the liquid enters through any of the gaps formed at the plurality of the boundaries. Further, since the ink receiver has a function of receiving liquid entering through a gap formed at the boundary in addition to the function of receiving ink ejected from the recording head, the cost for the apparatus can be reduced.

The present disclosure will now be specifically described. Throughout the figures, the X axis direction is an apparatus width direction, in which the −X direction is the right direction as seen from a user facing the front face of the apparatus, whereas the +X direction is the left direction. Further, the X axis direction is also a direction intersecting a paper sheet transport direction, that is, a paper sheet width direction in a region facing a recording head 22 in an apparatus main body 2, which will be described later. Further, the X axis direction is also a direction intersecting a document transport direction, that is, a document width direction in a reading mechanism 3, which will be described later. The Y axis direction is an apparatus depth direction, in which the +Y direction is a direction directed from the rear face to the front face of the apparatus, whereas the −Y direction is a direction directed from the front face to the rear face of the apparatus. In the present embodiment, among a plurality of side faces constituting the outer periphery of the apparatus, a side face on which a tilt panel 6 is provided is the front face of the apparatus, whereas the side face on opposite to the front face is the rear face of the apparatus. Further, in the Y axis direction, the +Y direction is also the paper sheet transport direction in a region facing the recording head 22 in the apparatus main body 2, which will be described later. Further, the X axis direction is also a document transport direction in the reading mechanism 3, which will be described later, and +Y direction is a document feeding direction. The Z axis direction is a vertical direction, in which the +Z direction is a vertically upward direction, whereas the −Z direction is a vertically downward direction.

Figure 2:
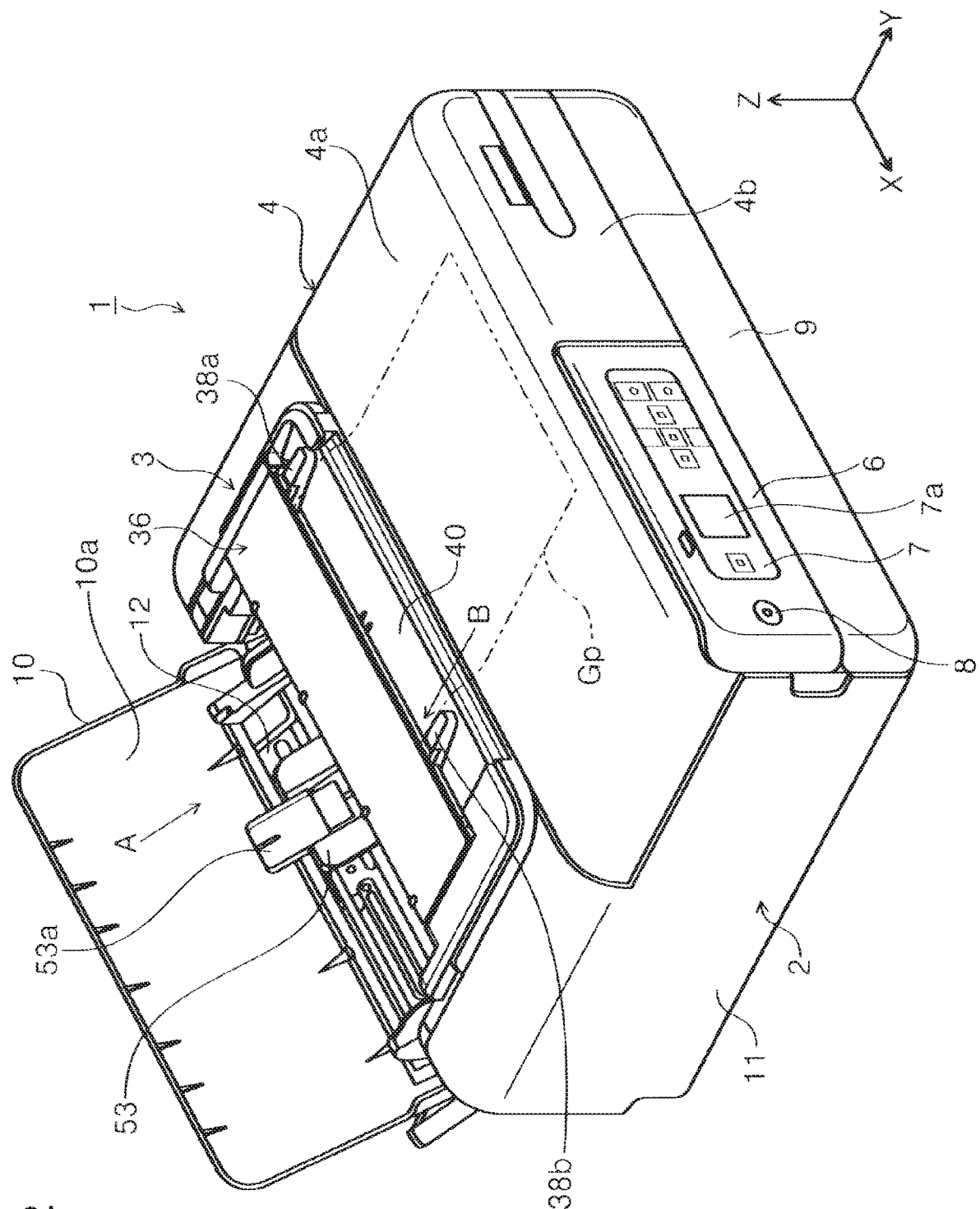
FIG. 2 is an appearance perspective view of a printer with an openable cover being closed and a scanner cover being open.

In FIGS. 1 and 2, an ink jet printer 1, which is an example of the recording apparatus, is a multifunction machine in which the reading mechanism 3 for reading documents is provided on an upper side of the apparatus main body 2. The reading mechanism 3 is an example of a unit body. Hereinafter, the ink jet printer 1 is simply referred to as a printer 1. The apparatus main body 2 has a function of performing recording on a recording paper, which is an example of a recording medium, and the reading mechanism 3 has a function of reading a document.

The apparatus main body 2 includes the tilt panel 6 provided on the front face of the apparatus. The tilt panel 6 includes a power button 8 for turning on and off the printer 1 and an operation unit 7 for performing various other operations. The tilt panel 6 is tiltable by rotating about a rotation shaft 6a (see FIG. 3). The operation unit 7 is provided with a display unit 7a that displays various information. Further, a front cover 9 is provided on the front face of the apparatus. The front cover 9 is configured to rotate about a rotation shaft 9a (see FIG. 3) to thereby assume a closed state shown in FIGS. 1 and 2 and an open state (not shown) in which an output path for a recording paper is exposed so that a recording paper on which recording is performed can be outputted.

The outer casing of the apparatus main body 2 is formed of a housing 11. Further, a front portion of the top of the apparatus main body 2 is formed of an openable cover 4. The openable cover 4 is configured to rotate about support shafts 54a and 54b (see FIGS. 7 to 10) to thereby assume a closed state shown in FIGS. 1 and 2 and an open state shown in FIG. 5 which exposes the inside of the apparatus main body 2. Hole the openable cover 4 allows for, for example, removal of a jammed recording paper or replenishment of ink in an ink tank 34, which will be described later. A front covering member 4b is integrally formed with the openable cover 4. The front covering member 4b is substantially perpendicular to a top 4a of the openable cover 4. When the openable cover 4, the front cover 9, and the tilt panel 6 are all closed, the surface of the front covering member 4b and the surface of the front cover 9 are flush with each other as shown in FIGS. 1 and 2.

A scanner cover 10, which is an example of openable member, is provided on a rear portion of the top of the apparatus. The scanner cover 10 is configured to rotate about a rotation shaft 10c (see FIGS. 3 and 4) to assume a closed state shown in FIGS. 1 and 3 and an open state shown in FIGS. 2 and 4. When the scanner cover 10 is open, the reading mechanism 3 is exposed, for example, as shown in FIG. 2 so that a document can be read. Further, when the scanner cover 10 is open, a hole 2a (see FIG. 4) for inserting a recording paper therethrough is exposed so that a recording paper can be set on a support member 12, which will be described later. In FIG. 2, the arrow A indicates a direction in which a recording paper is set. The scanner cover 10 is an example of a first openable member, which is configured to open by rotating with respect to the apparatus main body 2, and constitutes at least part of the top of the apparatus main body 2 when it is closed, and exposes the support member 12 (described later) that supports a recording paper in an inclined posture when it is open. Further, the scanner cover 10, when closed, covers the entirety of the reading mechanism 3, which will be described later, to thereby prevent dust and the like from entering the reading mechanism 3.

Next, with reference to FIGS. 3 and 4, a transport path for a recording paper in the apparatus main body 2 will be described. The support member 12 is provided in the rear part of the apparatus such that a recording paper before feeding is supported in an inclined posture by the support member 12 and a paper sheet support surface 10a formed by the rear surface of the scanner cover 10 in the open state as shown in FIG. 4. The support member 12 is configured to be swingable about a swing shaft (not shown) to thereby feed the supported recording paper forward or backward relative to a feed roller 13.

The feed roller 13 rotates to thereby feed the recording paper to a downstream part. A separation roller 14 to which rotation resistance is imparted is provided at a position facing the feed roller 13. The separation roller 14 cooperates with the feed roller 13 to form a nip area therebetween to prevent double feeding of recording papers. In FIG. 4, the dot-dot-dashed line denoted by reference numeral Pd indicates a transport trajectory of the recording paper fed out and transported by the feed roller 13.

The recording paper fed out by the feed roller 13 reaches a transport roller pair 17. The transport roller pair 17 is composed of a driving roller 18 driven by a driving source (not shown) and a driven roller 19 driven to rotate by the driving roller 18. The recording paper is nipped between these rollers, and is fed to an area facing the recording head 22, that is, a recording area where recording is performed.

A carriage 20 having a recording head 22 reciprocates in the X axis direction by a driving source (not shown) while being guided by a main frame 24 extending in the X axis direction. As the carriage 20 moves, the recording head 22 ejects ink onto the recording paper. The ink tank 34 is mounted in the carriage 20, and ink is supplied from the ink tank 34 to the recording head 22.

Figure 5:
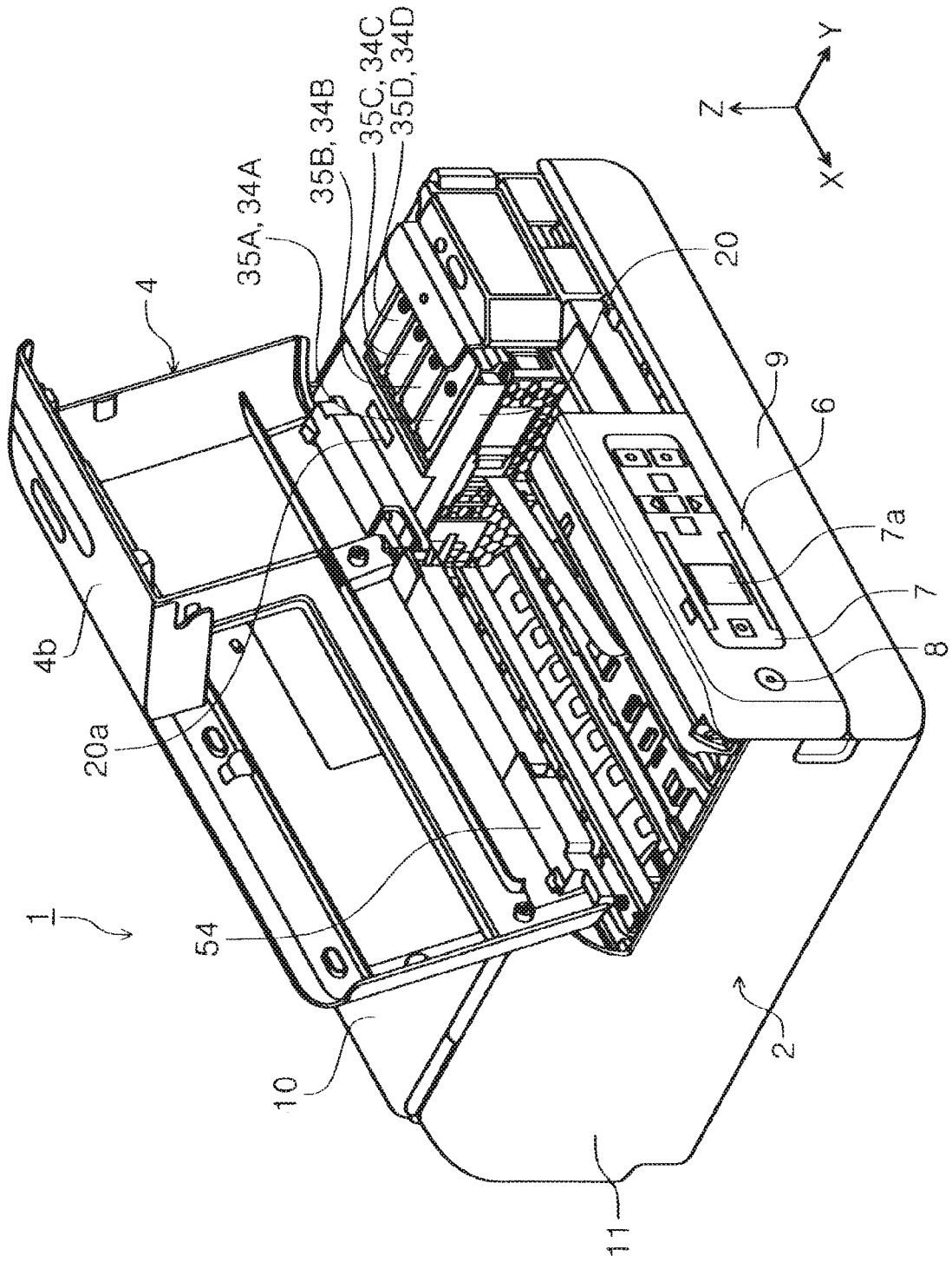
FIG. 5 is an appearance perspective view of a printer with an openable cover being open and a scanner cover being closed.

As shown in FIG. 5, when the openable cover 4 is open, the carriage 20 and the ink tank 34 mounted in the carriage 20 are exposed. The ink tank 34 is composed of a plurality of ink tanks 34A, 34B, 34C, and 34D, which are herein collectively referred to as the ink tank 34 unless otherwise specified. In the present embodiment, the plurality of ink tanks 34 may store different colors of ink, for example, black, cyan, magenta, and yellow ink. The plurality of ink tanks 34 are arranged side by side in the X axis direction.

The ink tank 34 has an openable lever in the upper part thereof. Specifically, the ink tank 34A has an openable lever 35A, the ink tank 34B has an openable lever 35B, the ink tank 34C has an openable lever 35C, and the ink tank 34D has an openable lever 35D. These openable levers are herein collectively referred to as the openable lever 35 unless otherwise specified. When the openable lever 35 is open, an ink inlet port (not shown) is exposed so that ink tank 34 can be refilled with ink via the ink inlet port. Further, an anti-static member 20a is provided on the top of the carriage 20. Providing the anti-static member 20a can reduce adhesion of ink mist to the top of the carriage 20. Since the openable lever 35 is provided on the top of the carriage 20, it is also possible to prevent staining of the finger operating the openable lever 35.

Figure 15:
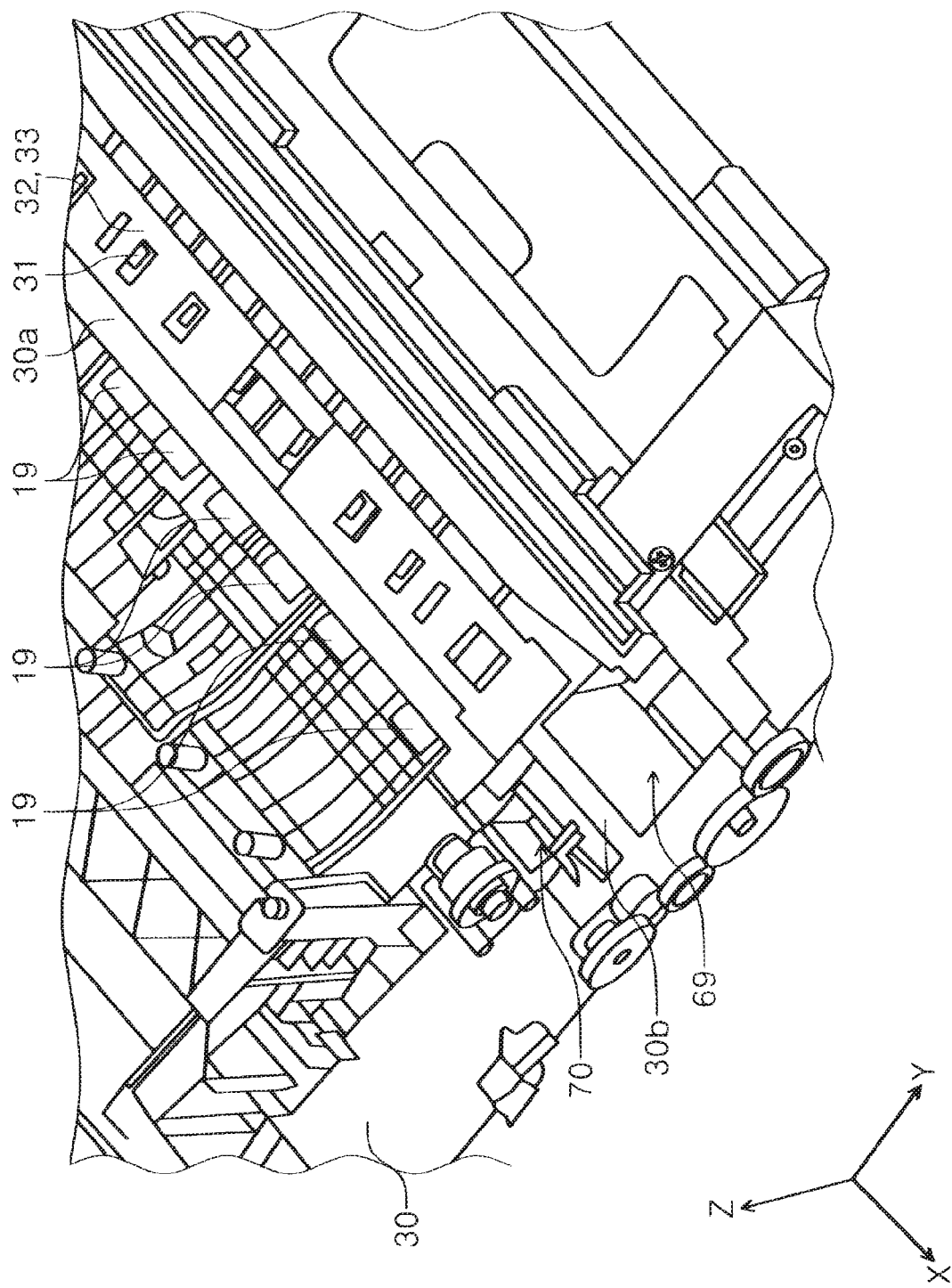
FIG. 15 is a partial perspective view of an inside of an apparatus main body.

Referring back to FIGS. 3 and 4, a support member 30a is provided at a position facing the recording head 22 such that the recording paper on which recording is to be performed by the recording head 22 is supported by the support member 30a. The support member 30a is provided integrally with a base frame 30 that constitutes a base body of the apparatus main body 2. An ink receiver 32 having a recessed shape is formed in the support member 30a. In the ink receiver 32, a plurality of support ribs 31 are provided at an appropriate interval in the X axis direction as shown in FIG. 15. The ink receiver 32 is provided with an ink absorber 33 for absorbing ink. The ink absorber 33 can be formed of, for example, a sponge. Since the ink receiver 32 is provided, ink can be ejected onto and outside the end portion of the recording paper, that is, marginless recording can be performed.

Referring back to FIGS. 3 and 4, an output roller pair 26 for outputting the recording paper toward the front of the apparatus is provided downstream the support member 30a in the transport direction. The output roller pair 26 is composed of a driving roller 27 driven by a driving source (not shown) and a driven roller 28 driven to rotate by the driving roller 27. The recording paper is nipped between these rollers, outputted toward the front of the apparatus, and supported by the output tray 29 in a pulled-out state.

The configuration of the apparatus main body 2 has been described above. The reading mechanism 3 provided on the upper side of the apparatus main body 2 will now be described with reference to FIGS. 2 and 4. The reading mechanism 3 is composed of an input tray 40, an upper unit 36, a lower unit 37, and an output tray 53.

A leading edge of the document to be read is supported by the input tray 40, and a trailing edge is supported by the top 4a (see FIG. 2) of the openable cover 4 (see FIG. 2). The arrow B in FIG. 2 indicates a direction in which the document to be read is set. Further, reference numeral Gp in FIG. 2 indicates the set document supported by the input tray 40 and the top 4a of the apparatus main body 2. Further, reference numerals 38a and 38b in FIG. 2 indicate edge guides that guide the side edges of the set document. The document transport direction during reading of the document in the reading mechanism 3 is substantially the −Y direction. A transport roller pair 41 is provided downstream the input tray 40 in the document transport direction as shown in FIG. 4 such that the document is nipped between the transport roller pair 41 and fed downstream in the document transport direction.

A sensor module 55 extending in the X axis direction, which is a reading unit, is provided downstream the transport roller pair 41 in the document transport direction. The sensor module 55 may be of a charge coupled device type (CCD type) or a contact image sensor type (CIS type). In the present embodiment, the contact image sensor type (CIS type) is employed. An output roller pair 48 for outputting the document on which reading is performed is provided downstream the sensor module 55. The document on which reading is performed is nipped between the output roller pair 48, and outputted toward the output tray 53.

Figure 3:
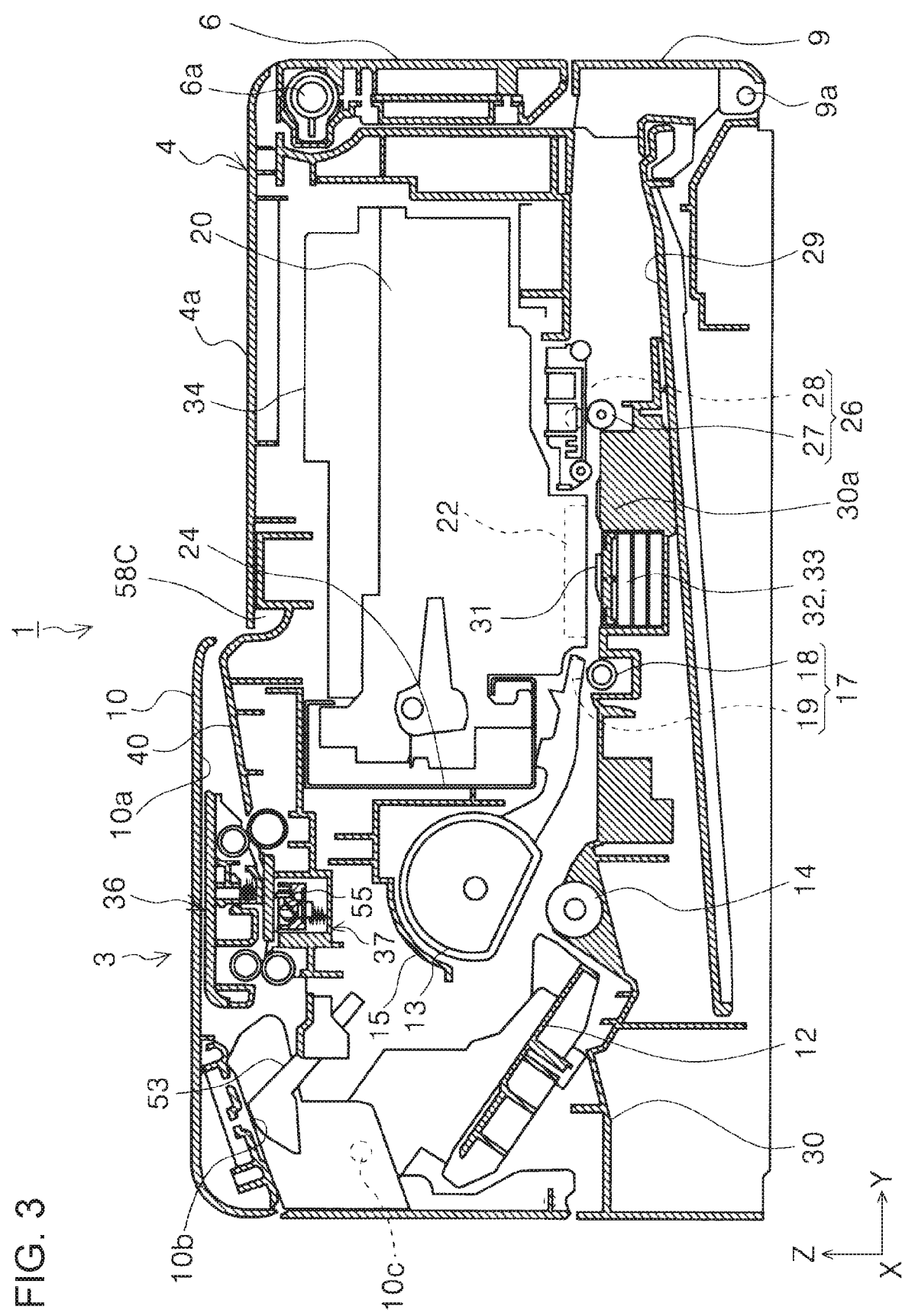
FIG. 3 is a side cross-sectional view of a printer with an openable cover and a scanner cover being closed.
Figure 4:
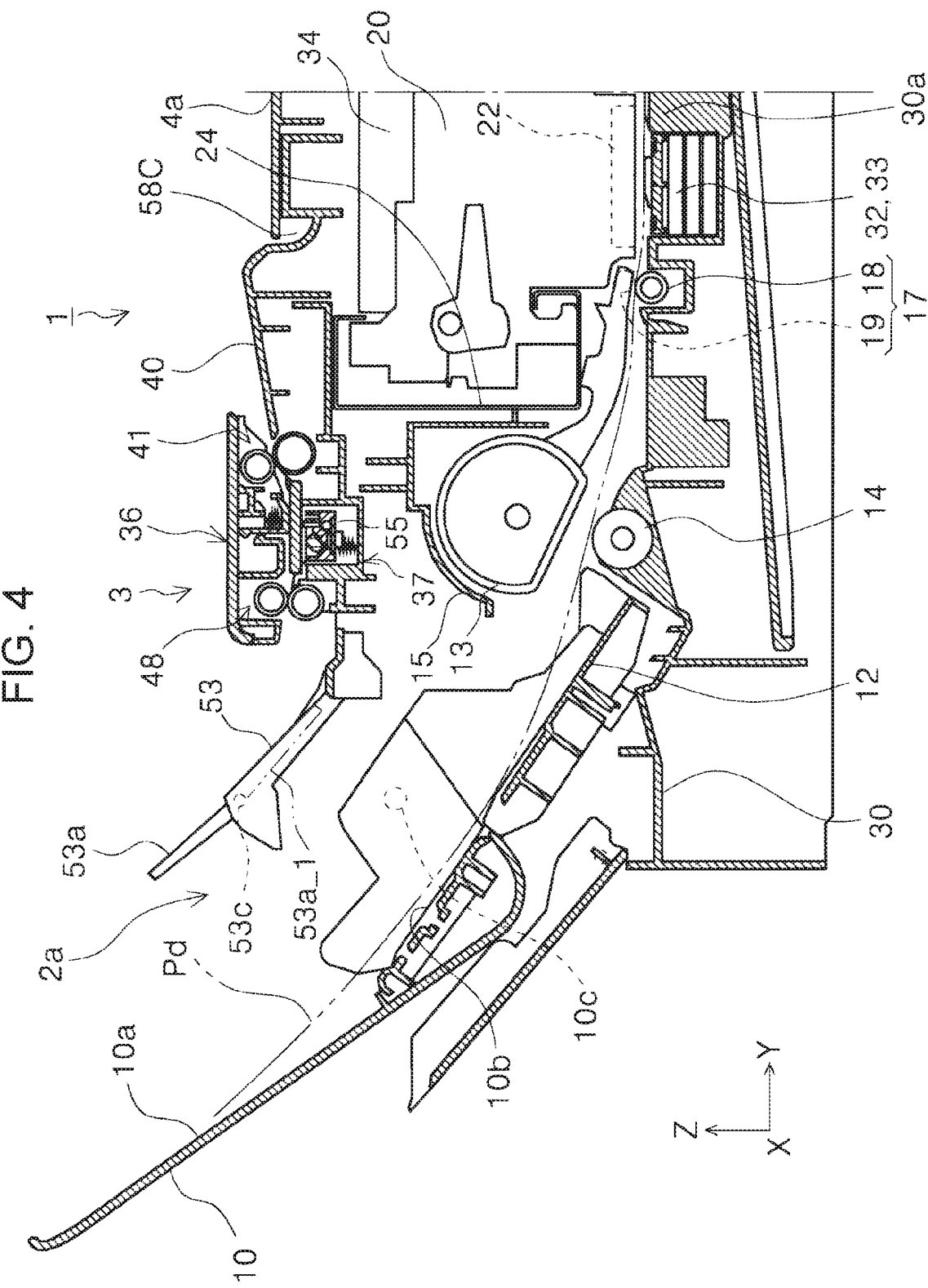
FIG. 4 is a side cross-sectional view of a printer with an openable cover being closed and a scanner cover being open.

The output tray 53 is configured to be displaced diagonally upward and downward in a sliding manner so as to be switched between a non-expanded state shown in FIG. 3 and an expanded state shown in FIGS. 4 and 2, and is also configured to expand a sub tray 53a. The sub tray 53a is configured to rotate about a rotation shaft 53c in the clockwise direction and the counterclockwise direction in FIG. 4 to thereby assume an expanded state indicated by the solid line in FIG. 4 and a housed state indicated by the dot-dot-dashed line and reference numeral 53a_1. When a long document is ejected, the leading edge of the document goes beyond the output tray 53 and is supported by the paper sheet support surface 10a of the scanner cover 10 located behind the output tray 53.

Figure 6:
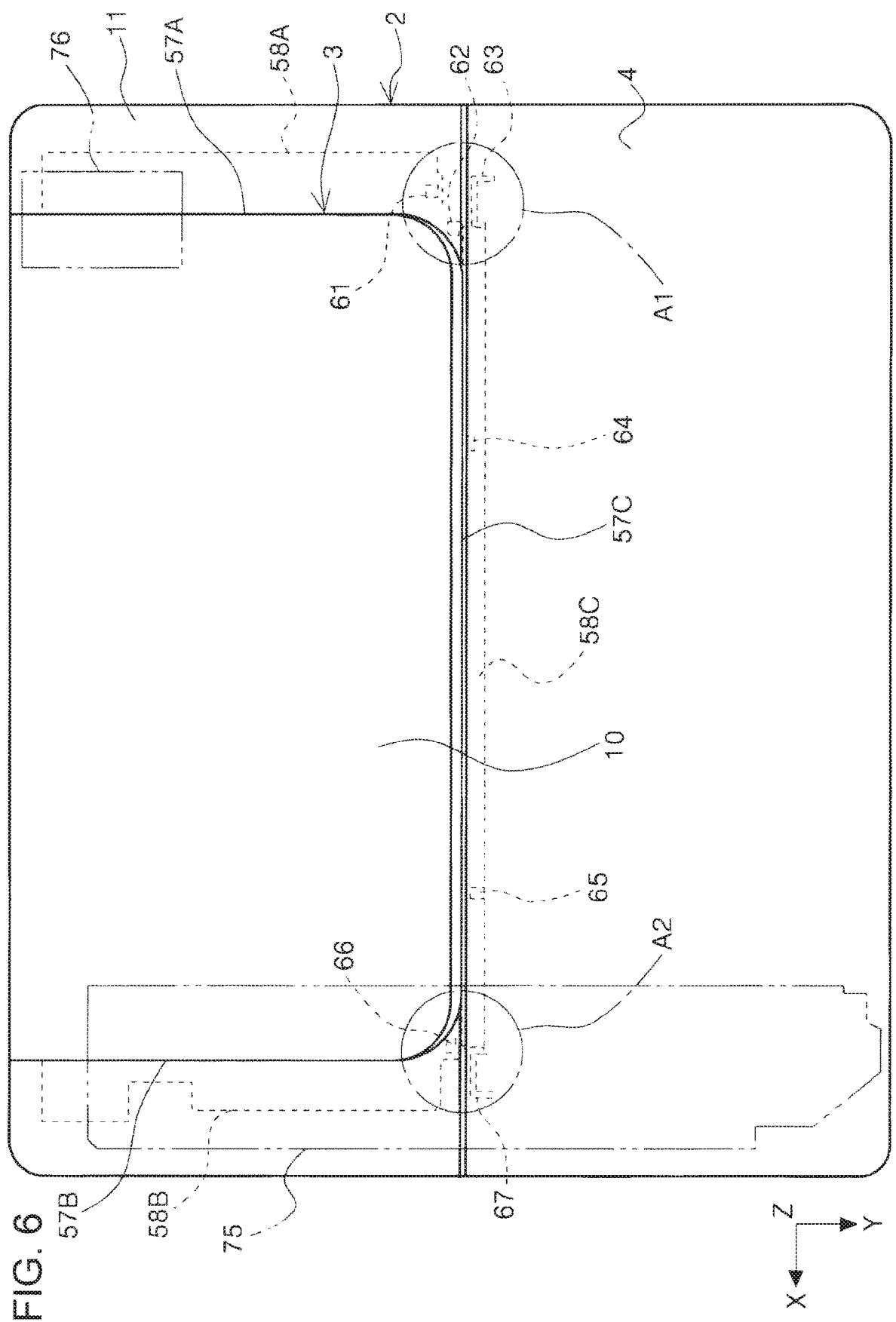
FIG. 6 is a plan view of a printer with an openable cover and a scanner cover being closed.

Next, with reference to FIG. 6 and subsequent figures, a recess that receives liquid when liquid is spilled on the top of the printer 1 will be described. As shown in FIG. 6, the reading mechanism 3 as a unit body provided on the upper side of the apparatus main body 2 forms a plurality of boundaries between the reading mechanism 3 and the top of the apparatus main body 2. More specifically, a first boundary 57A and a second boundary 57B are formed between the reading mechanism 3 and housing 11, and a third boundary 57C is formed between the reading mechanism 3 and the openable cover 4. In the present embodiment, the first boundary 57A and the second boundary 57B are located on a first side and a second side in the X axis direction relative to the reading mechanism 3, respectively. Both the first boundary 57A and the second boundary 57B extends in the Y axis direction. Further, the third boundary 57C, which extends in the X axis direction, is located on the +Y side relative to the reading mechanism 3.

Further, the position where the first boundary 57A and the third boundary 57C intersect with each other, and the position where the second boundary 57B and the third boundary 57C intersect with each other are formed in the round shape. In FIG. 6, reference numeral A1 indicates a region where the first boundary 57A and the third boundary 57C intersect with each other, and reference numeral A2 indicates a region where the second boundary 57B and the third boundary 57C intersect with each other. The region A1 includes a position where a line extending the first boundary 57A in the +Y direction and a line extending the third boundary 57C in the −X direction intersect with each other, and the region A2 includes a position where a line extending the second boundary 57B in the +Y direction and a line extending the third boundary 57C in the +X direction intersect with each other.

The first boundary 57A and the second boundary 57B are boundaries formed between the holding frame 54 (see FIG.

Figure 7:
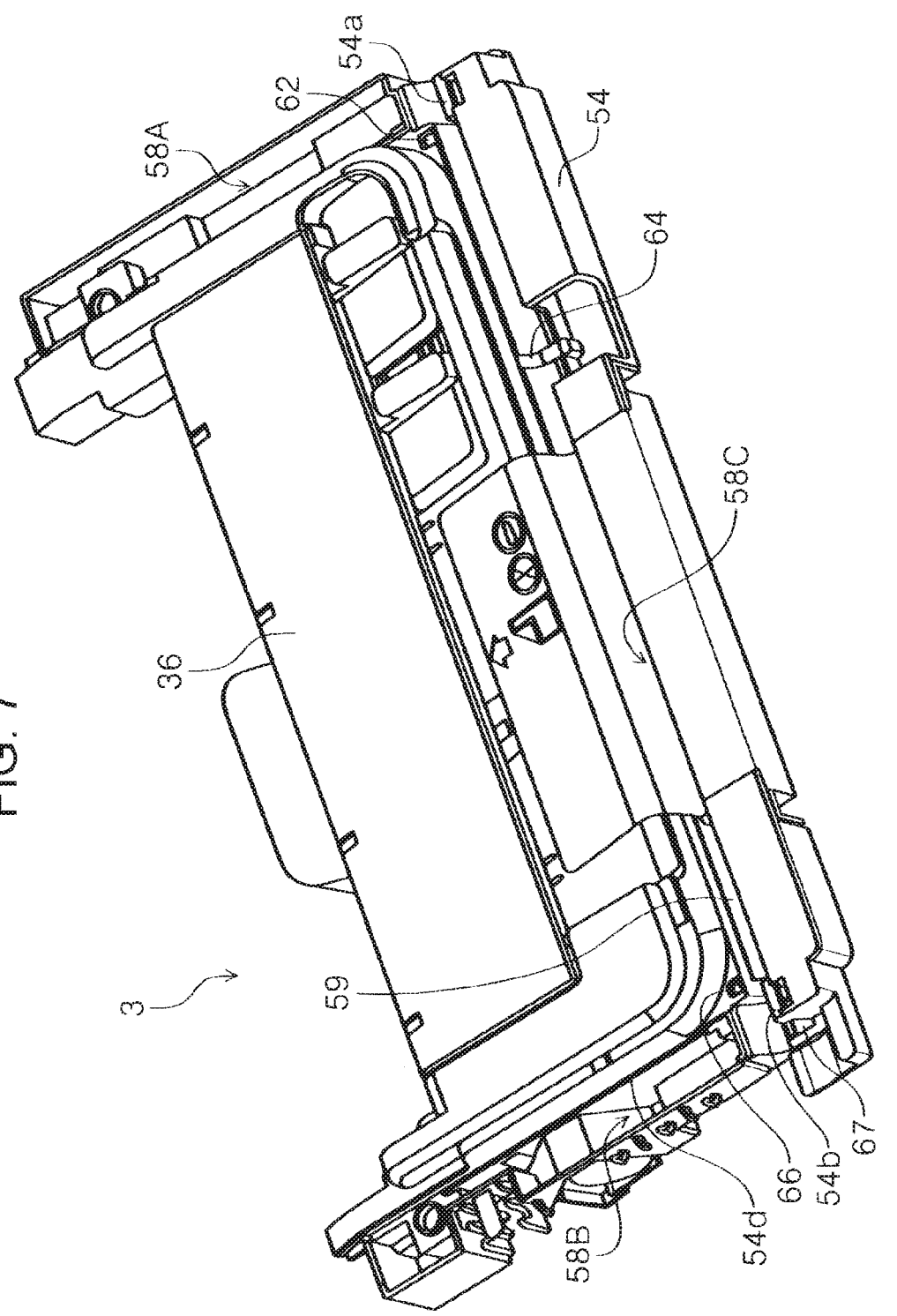
FIG. 7 is a perspective view of a reading mechanism.

7) that constitutes the base body of the reading mechanism 3 and the housing 11 that constitutes the outer casing of the apparatus main body 2, in other words, gaps between the holding frame 54 and the housing 11. Further, the third boundary 57C is a boundary formed between the holding frame 54 and the openable cover 4, in other words, a gap between the holding frame 54 and the openable cover 4. When a user spills liquid such as a drink, for example, on the top of the printer 1, the liquid may enter the apparatus main body 2 through the boundary. In some cases, the liquid may be transmitted to a live part such as a circuit board or a power supply unit and damage a function of the apparatus. Therefore, in the printer 1, a recess for receiving the liquid entering through the boundary is provided for each of the first boundary 57A, the second boundary 57B, and the third boundary 57C. In the following description, these boundaries are simply referred to as a boundary unless they need to be distinguished. In FIGS. 6 and 7, the first recess 58A is a recess corresponding to the first boundary 57A, the second recess 58B is a recess corresponding to the second boundary 57B, and the third recess 58C is a recess corresponding to the third boundary 57C. In the following description, these recesses are simply referred to as a recess unless they need to be distinguished.

In the present embodiment, the apparatus includes a circuit board 75 on the +X side in the X axis direction, and a power supply unit 76 on the −X side at a position close to the rear face of the apparatus. Accordingly, when liquid enters through the boundaries, the recesses can prevent the liquid from reaching the circuit board 75 or the power supply unit 76 and maintain a function of the apparatus. Further, since the recesses are configured to first receive the liquid entering through the boundaries, it is not necessary to provide a groove that traverses the apparatus in plan view for discharging the liquid to the outside of the apparatus. Therefore, the recesses can be easily provided for the respective boundaries. Thus, in the configuration in which a plurality of boundaries are formed on the top of the apparatus, it is possible to prevent liquid from flowing into an undesired position in the apparatus, for example, a live part, even if the liquid enters through any of the plurality of the boundaries. In addition, the liquid entering through the boundaries is first received by the recesses, that is, the liquid entering through the boundaries is not immediately discharged outside the apparatus, and is further expected to evaporate over time, which reduces the possibility that the surface on which the apparatus is placed is immediately stained.

Figure 12:
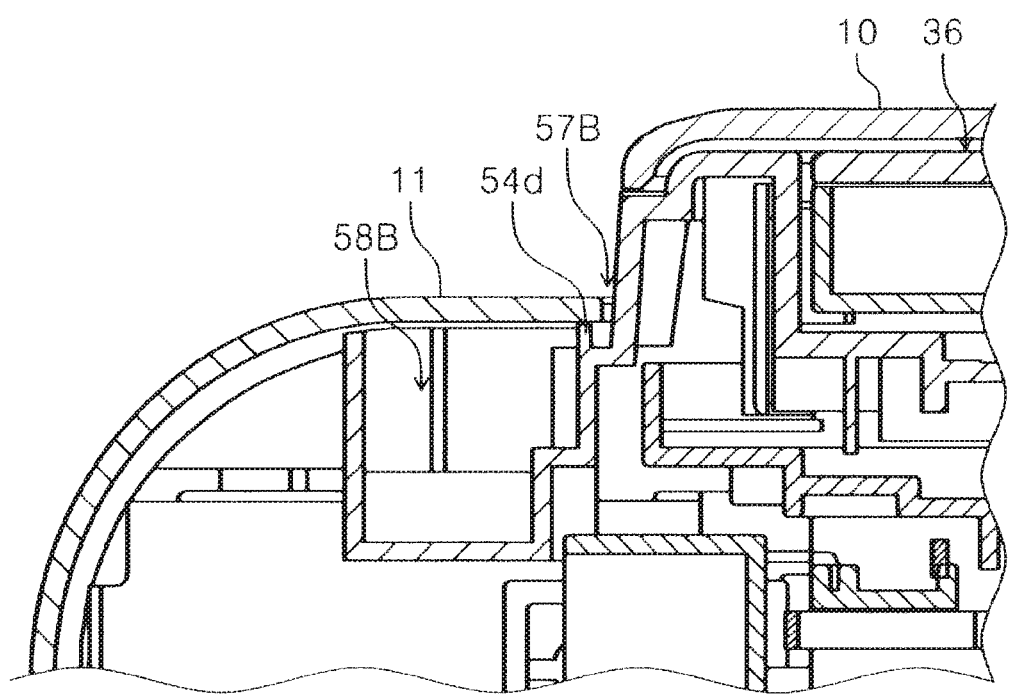
FIG. 12 is a partial cross-sectional view of a printer.
Figure 13:
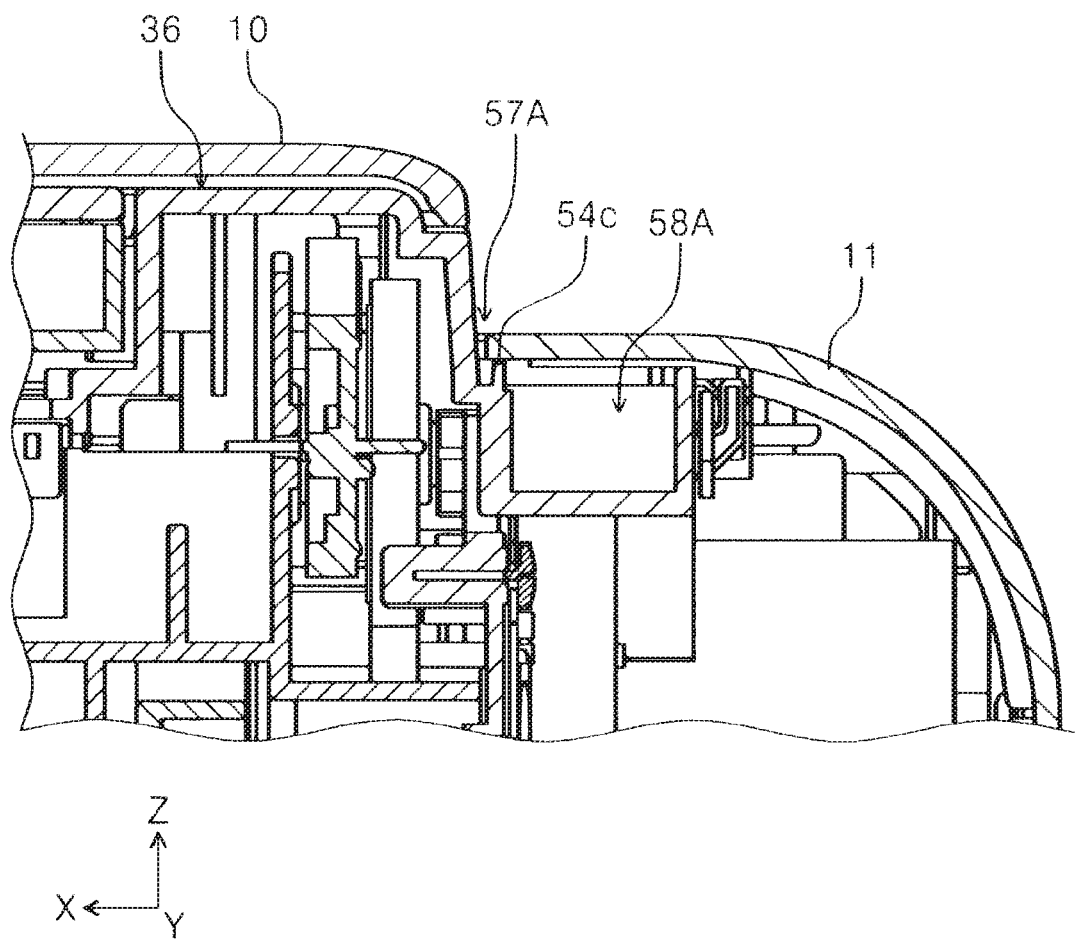
FIG. 13 is a partial cross-sectional view of a printer.

The details are further described below. As shown in FIGS. 7 to 10, the first recess 58A and the second recess 58B are formed in a tray shape extending in the Y axis direction. A rib 54c extending in the Y axis direction is provided on the +X side relative to the first recess 58A, and a rib 54d extending in the Y axis direction is provided on the −X side relative to the second recess 58B. The rib 54c is in contact with the rear surface of the housing 11 as shown in FIG. 13. Accordingly, when liquid enters through the first boundary 57A, liquid is prevented from moving in the −X direction along the rear surface of the housing 11. The liquid that has entered through the first boundary 57A enters the first recess 58A from the −Y direction end or the +Y direction end of the rib 54c. Similarly, the rib 54d is in contact with the rear surface of the housing 11 as shown in FIG. 12. Accordingly, when liquid enters through the second boundary 57B, liquid is prevented from moving in the +X direction along the rear surface of the housing 11. The liquid that has entered through the second boundary 57B enters the second recess 58B from the −Y direction end or the +Y direction end of the rib 54d.

The third recess 58C extends in the X axis direction, and a third hole 63 is formed on the −X direction end of the third recess 58C, and a seventh hole 67 is formed on the +X direction end of the third recess 58C. Further, a fourth hole 64 and a fifth hole 65 are formed between these ends. Due to the holes formed in the third recess 58C, liquid can be prevented from overflowing from the third recess 58C when the liquid exceeding a maximum storage amount enters the third recess 58C.

Figure 14:
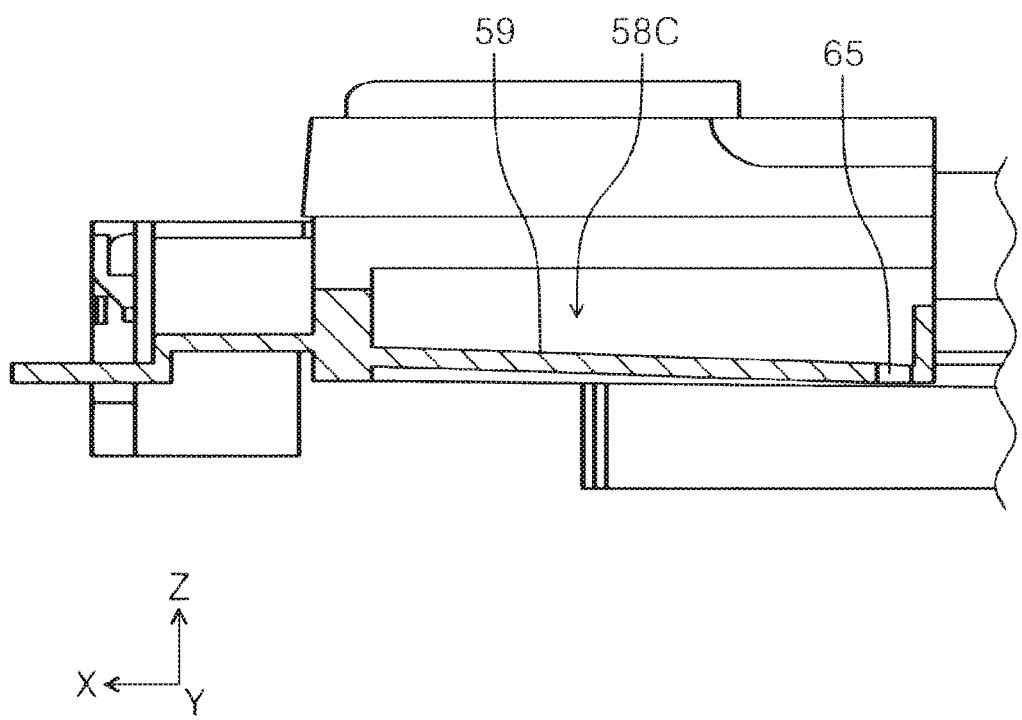
FIG. 14 is a partial cross-sectional view of a printer.

A bottom 59 of the third recess 58C in the +X direction is formed as an inclined surface extending downward in the −X direction as shown in FIG. 14, in other words, an inclined surface extending downward toward the fifth hole 65. Therefore, the liquid that has entered the third recess 58C can be appropriately guided to the fifth hole 65.

Figure 11:
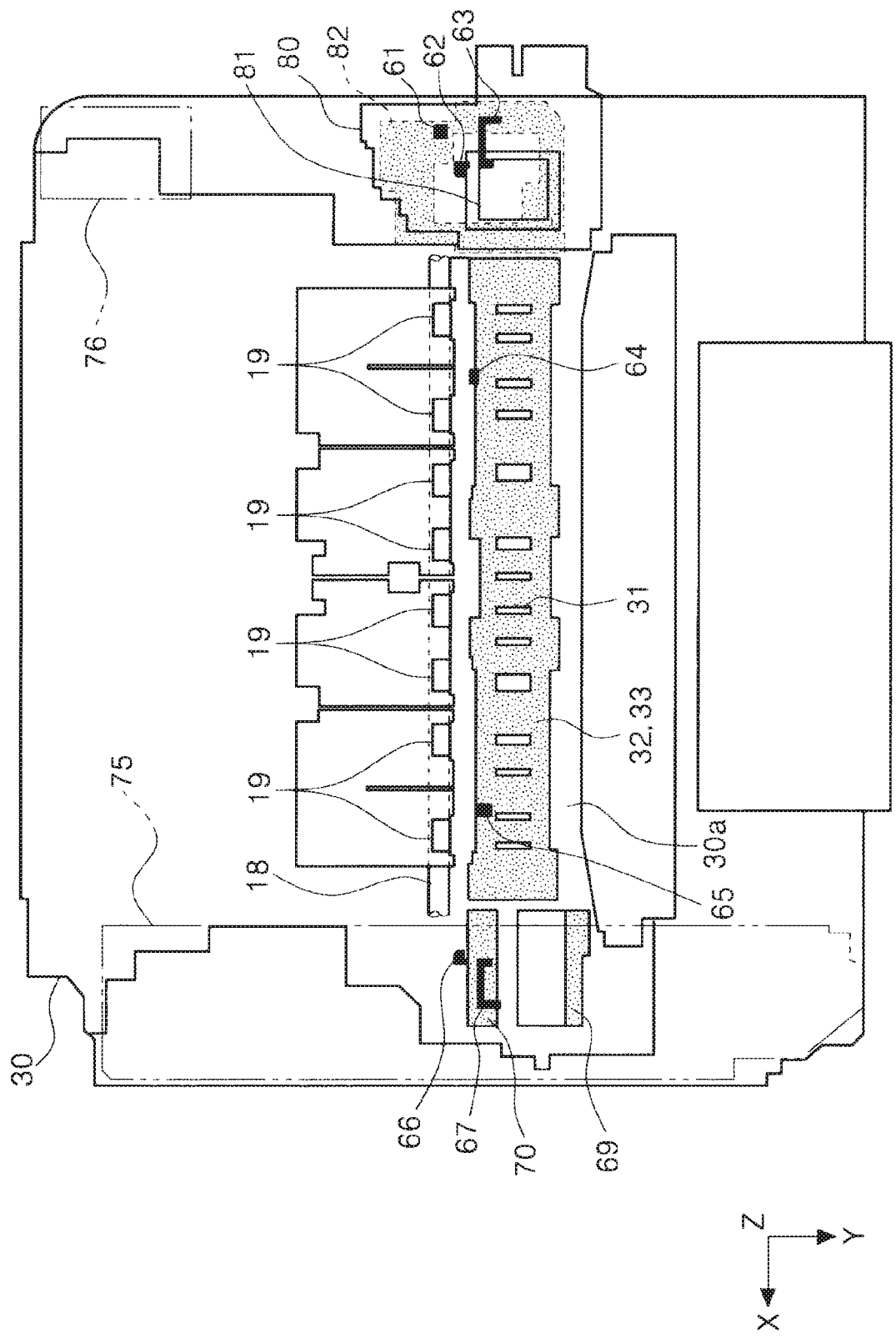
FIG. 11 is a plan view of an inside of an apparatus main body.

FIG. 11 illustrates the position, shape, and size of the respective holes as the filled shapes in plan view of the support member 30a. As shown in FIG. 11, the fourth hole 64 and the fifth hole 65 are located above the ink receiver 32 that receives ink ejected from the recording head 22 (see FIG. 3) such that the liquid that drops from the fourth hole 64 and the fifth hole 65 provided in the third recess 58C is received by the ink receiver 32. That is, since the ink receiver 32 has a function as a liquid receiver that receives liquid entering through the third boundary 57C (see FIG. 6) in addition to the function of receiving ink ejected from the recording head 22, the cost for the apparatus can be reduced. Further, since the fourth hole 64 and the fifth hole 65 are located at positions that do not interfere with the support ribs 31, it is possible to prevent the support ribs 31 from being stained, and thus prevent the recording paper from being stained. In addition, since the ink receiver 32 is provided with the ink absorber 33 that absorbs ink, it is possible to prevent liquid or ink from overflowing from the ink receiver 32 when the apparatus is tilted. As described above, since the printer 1 has a configuration in which the liquid entering through the boundaries is guided to the ink receiver 32 and received by the ink receiver 32, the liquid entering through the boundaries is not immediately discharged outside the apparatus, and is further expected to evaporate over time, which reduces the possibility that the surface on which the apparatus is placed is immediately stained.

Figure 9:
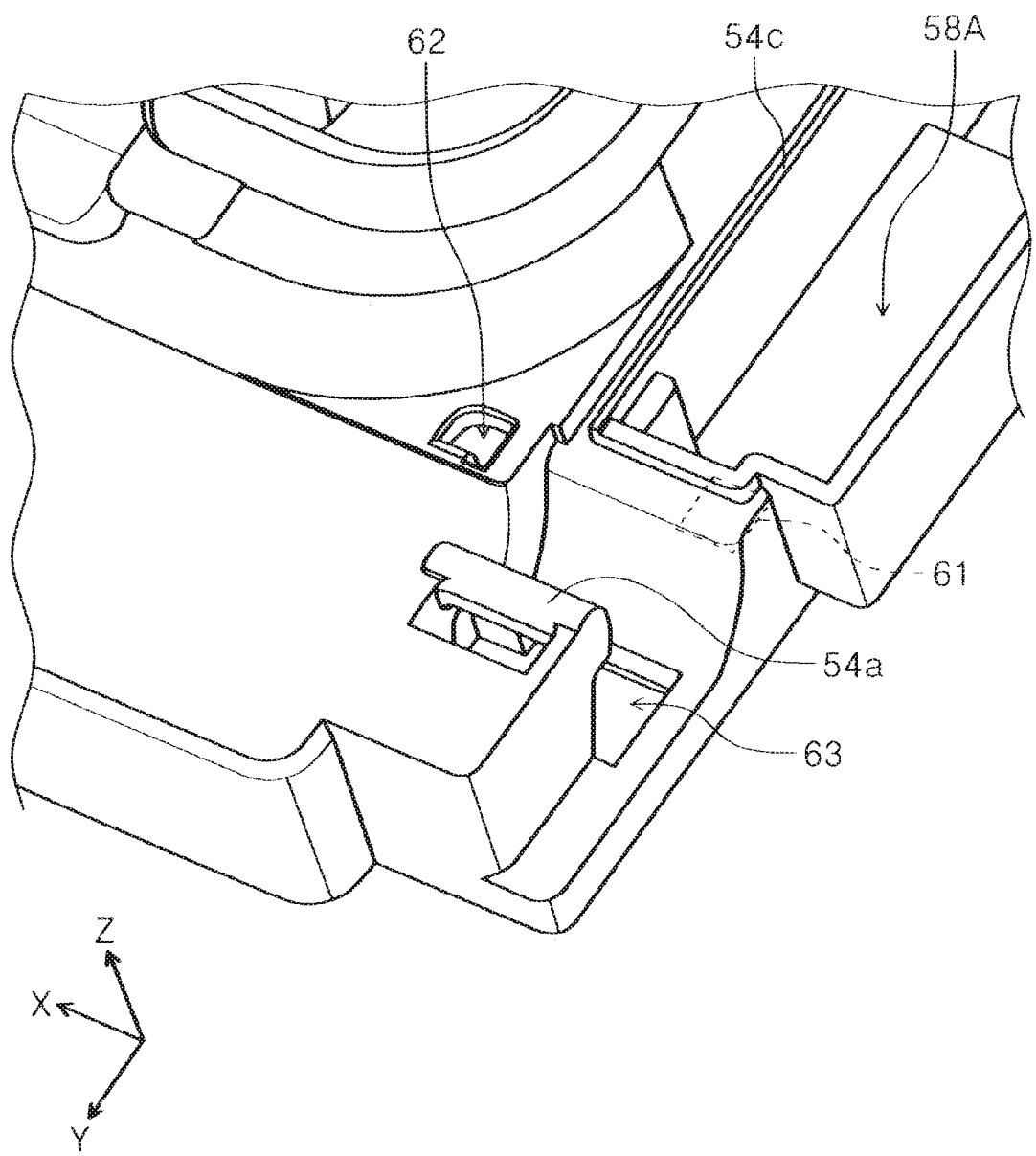
FIG. 9 is a partial enlarged perspective view of a reading mechanism.
Figure 10:
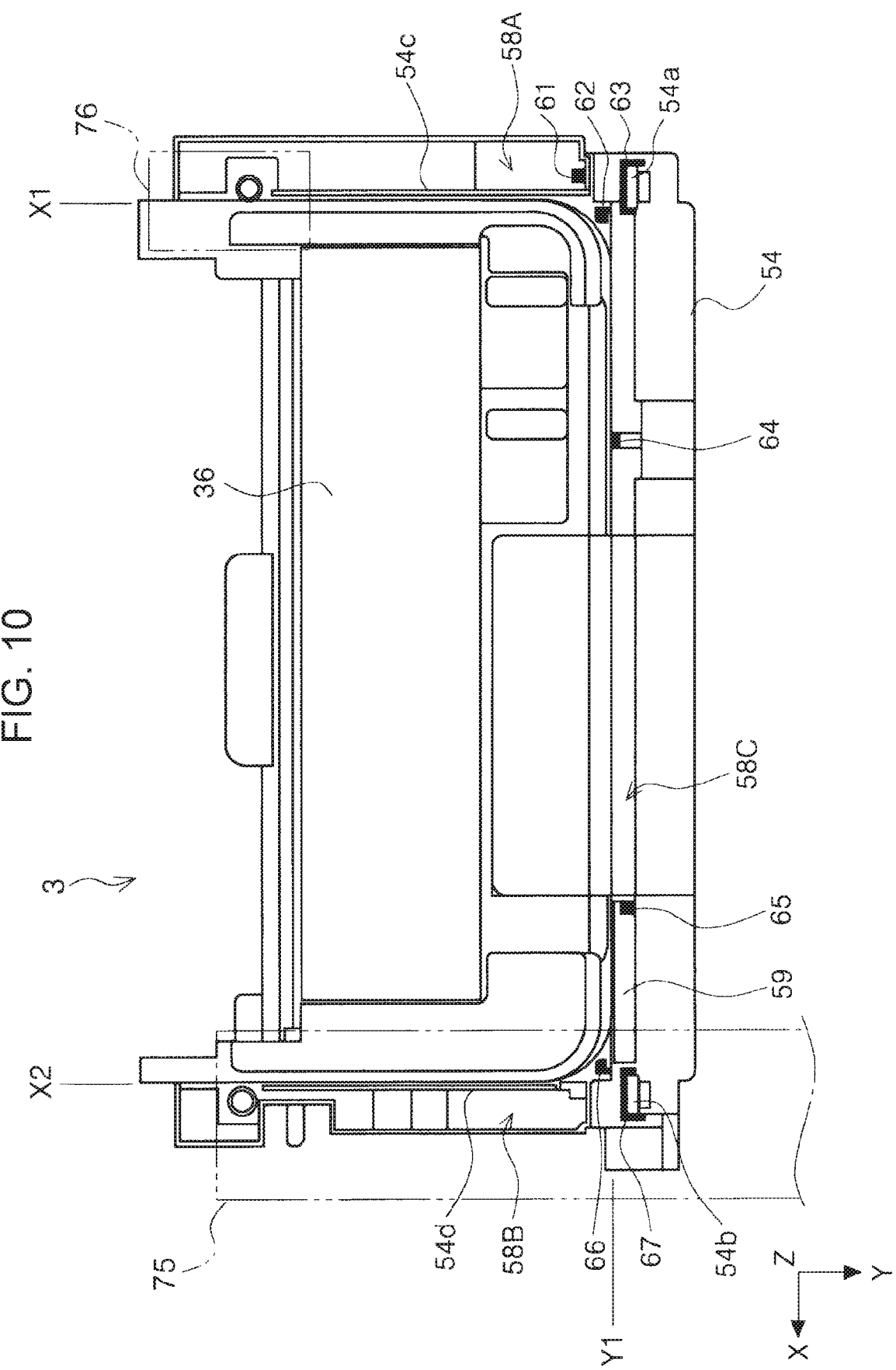
FIG. 10 is a plan view of a reading mechanism.

As shown in FIGS. 9 and 10, a first hole 61 for allowing liquid to drop down is formed in the first recess 58A. Further, a second hole 62 and a third hole 63 for allowing liquid to drop down are formed in the region A1 (see FIG. 6) where the first boundary 57A and the third boundary 57C intersect with each other. On the other hand, in the present embodiment, the carriage 20 has a home position on the end where the first boundary 57A (see FIG. 6) is provided, that is, on the −X direction end. In the home position, a maintenance unit 80 is provided as shown in FIG. 11. The maintenance unit 80 is provided with a cap 81, which seals the head surface of the recording head 22 when the carriage 20 is located at the home position.

An ink absorber 82 for absorbing ink is provided under the maintenance unit 80, and, as shown in FIG. 11, the first hole 61, the second hole 62, and the third hole 63 are positioned above the ink absorber 82. Therefore, the liquid dropping through each hole is first received by the maintenance unit 80, and, when the liquid further drops down from the maintenance unit 80, it is absorbed by the ink absorber 82. With this configuration, it is possible to prevent the inside of the apparatus from being stained with the liquid.

Further, since the ink absorber 82 has a function of absorbing the liquid entering through the first boundary 57A (see FIG. 6) or the third boundary 57C (see FIG. 6) in addition to the function of absorbing ink ejected from the recording head 22, the cost for the apparatus can be reduced. With this configuration, liquid is received by the maintenance unit 80 or absorbed by the ink absorber 82 mainly when the carriage 81 is shifted from the home position. In addition, when the carriage 81 is located at the home position, liquid can flow along the outer surface of the carriage 81 into the ink absorber 82 and absorbed by the ink absorber 82.

Figure 8:
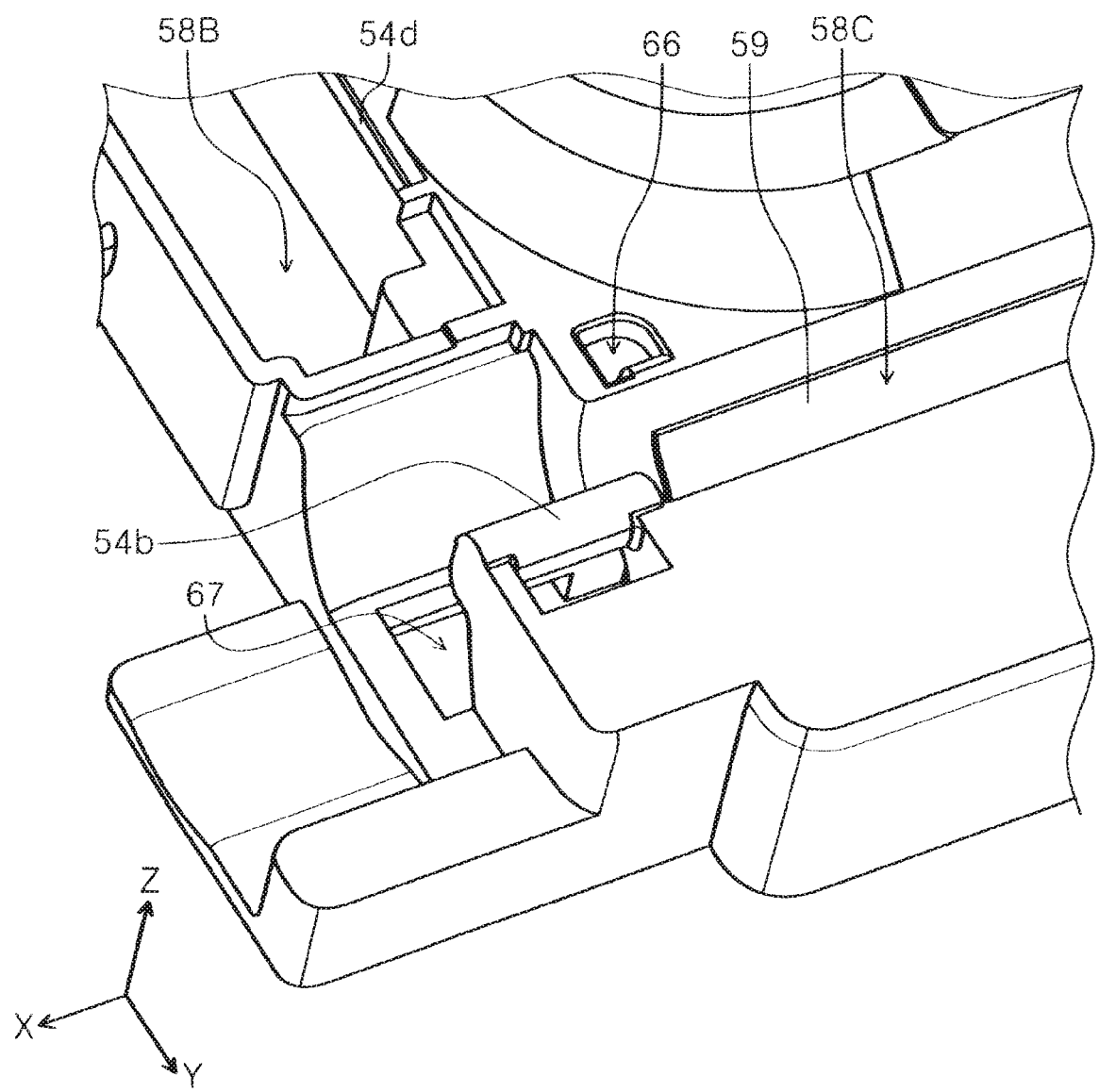
FIG. 8 is a partial enlarged perspective view of a reading mechanism.
Figure 16:
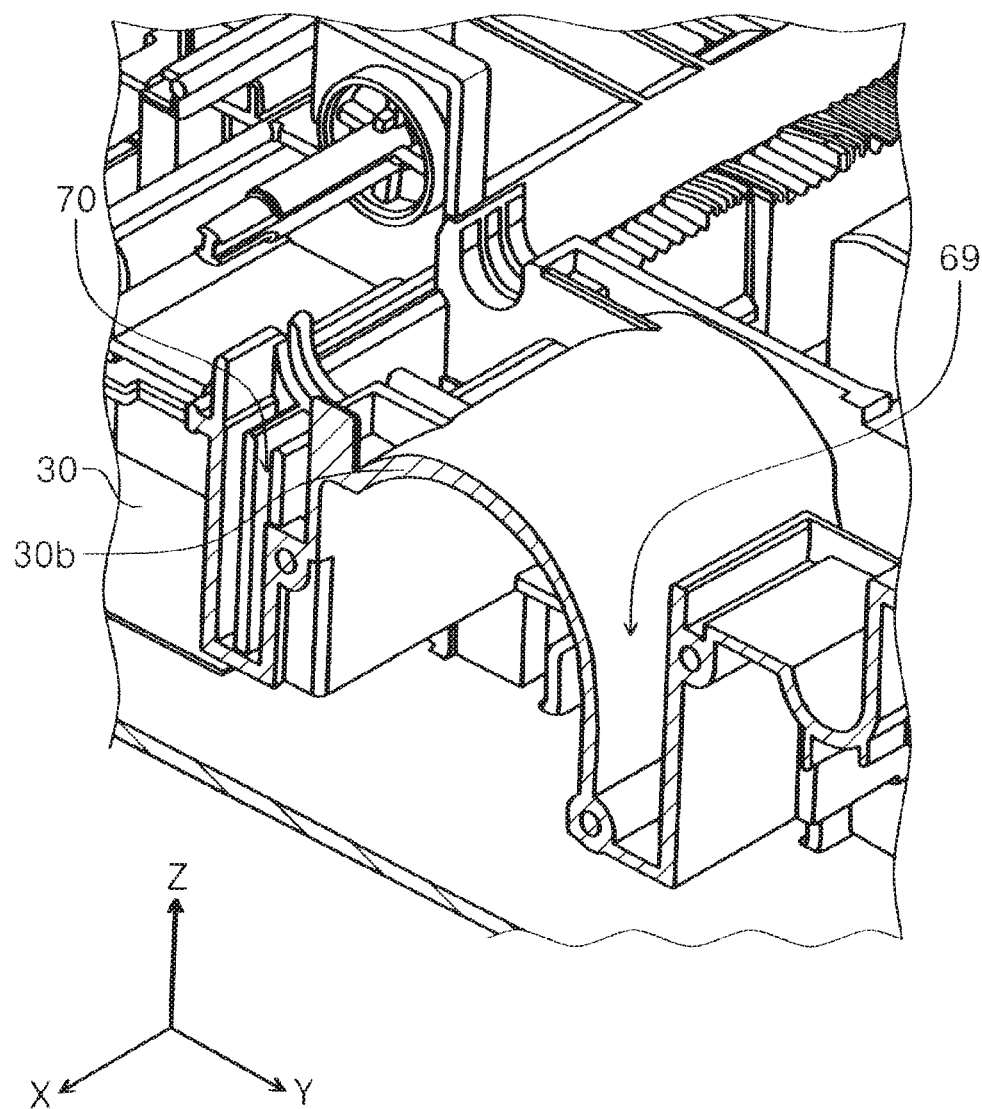
FIG. 16 is a partial cross-sectional view of a base frame.

On the other hand, on the end opposite to the home position of the carriage 20, that is, on the +X direction end, a first liquid receiver 69 and a second liquid receiver 70 are formed in the base frame 30 as shown in FIGS. 11, 15, and 16. In the present embodiment, as shown in FIGS. 15 and 16, the first liquid receiver 69 and the second liquid receiver 70 are provided adjacent to a motor accommodating section 30b that accommodates a motor (not shown). Further, as shown in FIGS. 8 and 10, a sixth hole 66 and a seventh hole 67 for allowing liquid to drop down are formed in the region A2 (see FIG. 6) where the second boundary 57B (see FIG. 6) and the third boundary 57C (see FIG. 6) intersect with each other. The second liquid receiver 70 is located under the sixth hole 66 and the seventh hole 67. In addition, when the liquid overflows from the second liquid receiver 70, the liquid can flow into the first liquid receiver 69. Accordingly, these liquid receivers can prevent the inside of the apparatus from being stained with the liquid.

The circuit board 75 is located under the first liquid receiver 69 and the second liquid receiver 70. Therefore, the first liquid receiver 69 and the second liquid receiver 70 can reduce adhesion of liquid to the circuit board 75, which reduces a failure of the apparatus.

As described above, the hole is formed in each recess. Specifically, as shown in FIG. 10, the first hole 61 is formed in the first recess 58A, and the third hole 63, the fourth hole 64, the fifth hole 65, and the seventh hole 67 are formed in the third recess 58C so that the liquid entering through the first boundary 57A (see FIG. 6) or the third boundary 57C (see FIG. 6) is guided through the respective holes to the liquid receivers corresponding to the holes. As described above, the liquid receiver corresponding to the first hole 61, the second hole 62, and the third hole 63 is the maintenance unit 80 (see FIG. 11) or the ink absorber 82. The liquid receiver corresponding to the fourth hole 64 and the fifth hole 65 is the ink receiver 32 (see FIG. 11). The liquid receiver corresponding to the sixth hole 66 and the seventh hole 67 is the second liquid receiver 70 (see FIG. 11). With this configuration, liquid can be prevented from overflowing from the respective recesses when the liquid exceeding a maximum storage amount enters the respective recesses. In the present embodiment, although a hole for allowing liquid to drop down is not formed in the second recess 58B, a hole for allowing liquid to drop down may also be formed in the second recess 58B. Further, in this case, a liquid receiver for receiving liquid that drops from the hole is preferably provided. Alternatively, a wall of the second recess 58B on the +Y direction end may be lowered or a groove may be formed so that the liquid flows toward the seventh hole 67 when the liquid exceeding a maximum storage amount flows into the second recess 58B.

Further, it is preferred to provide a liquid absorber for absorbing liquid in each liquid receiver. In particular, among a plurality of liquid receivers in the above embodiment, a liquid absorber is not provided in the first liquid receiver 69 and the second liquid receiver 70 (see FIG. 15). However, by providing a liquid absorber, it is possible to prevent liquid from overflowing from each liquid receiver when the apparatus is tilted. Further, each liquid receiver may also be provided with a discharge hole for discharging liquid to the outside of the apparatus. In this case, the discharge hole is preferably provided at a certain height position from the bottom of the liquid receiver rather than in the bottom. With this configuration, liquid can be expected to evaporate, reducing the amount of liquid discharged outside the apparatus.

Figure 17:
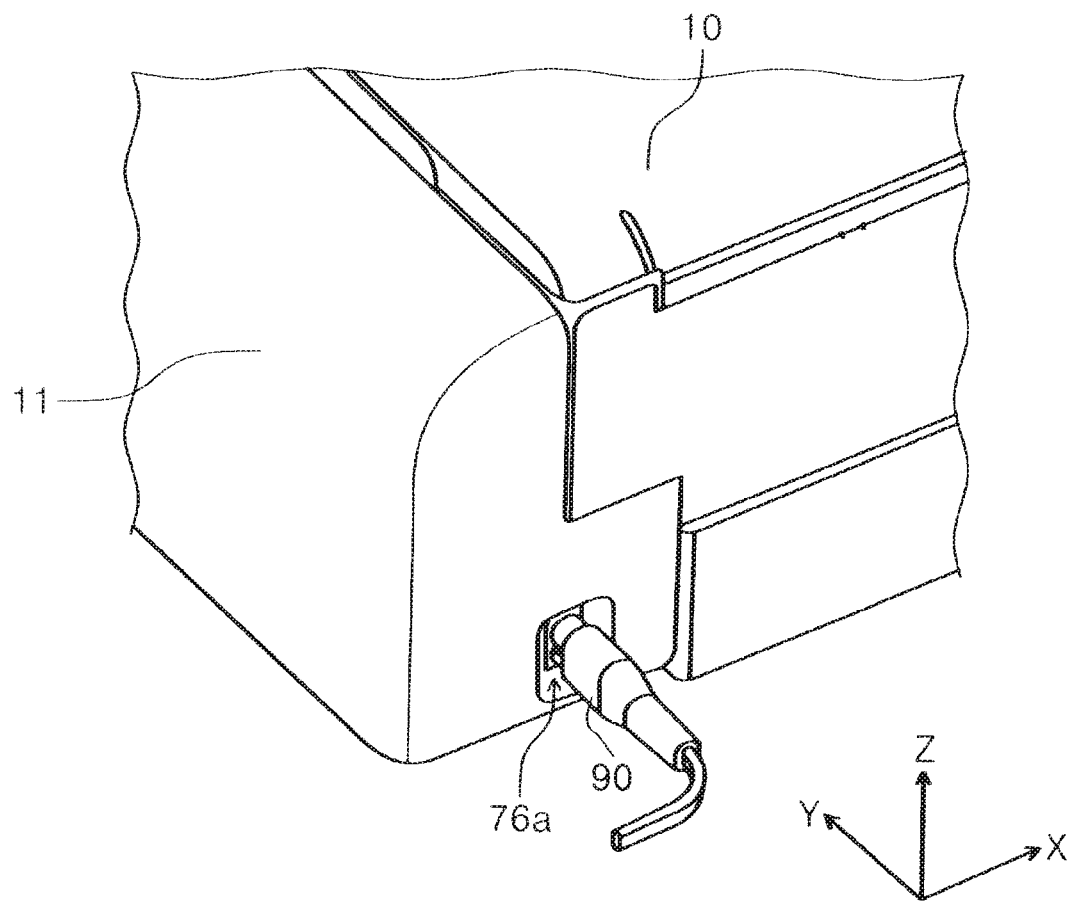
FIG. 17 is a partial enlarged perspective view of a rear face of a printer.
Figure 18:
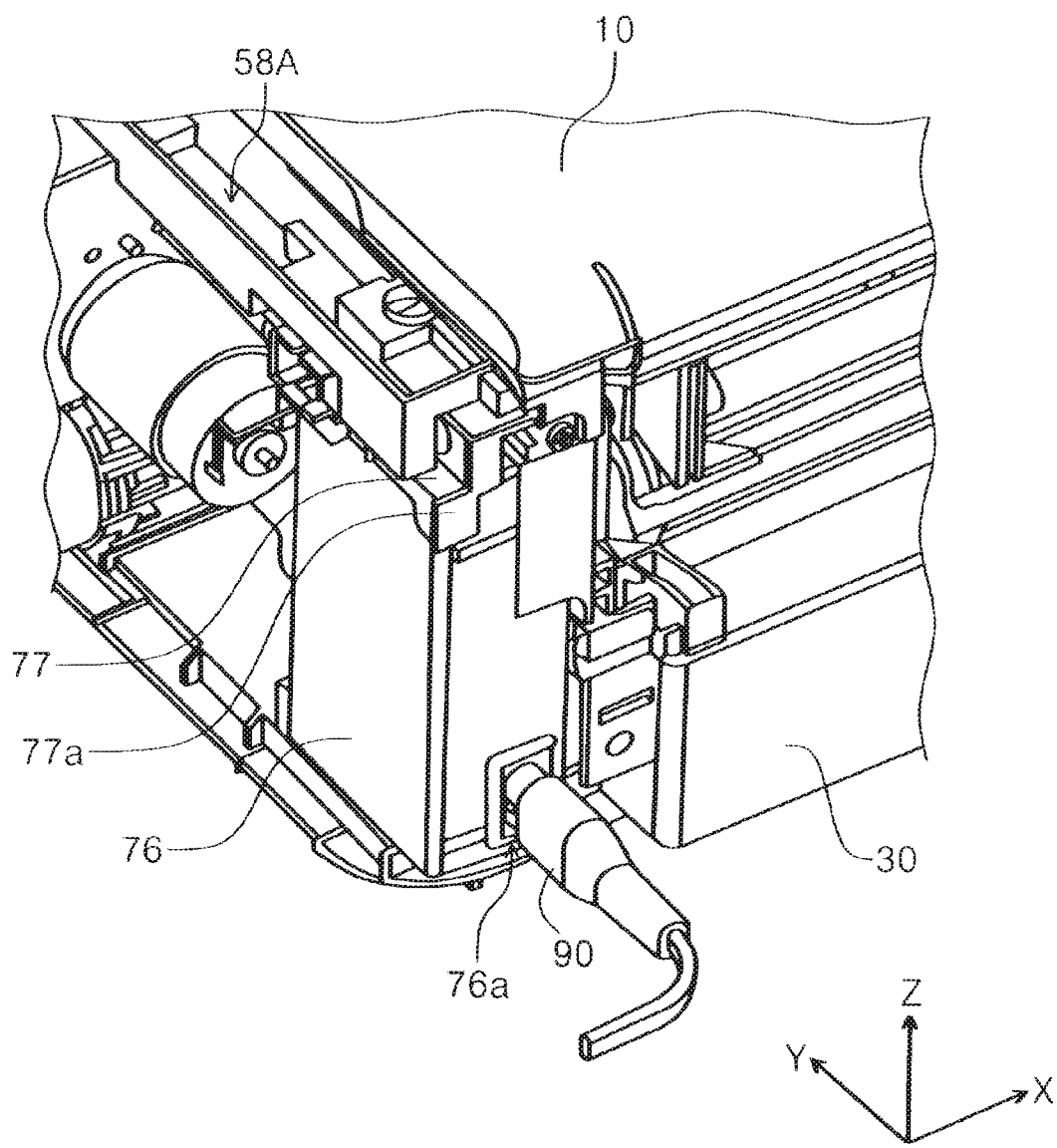
FIG. 18 is a view illustrating that a housing is removed from a configuration shown in FIG. 17.
Figure 19:
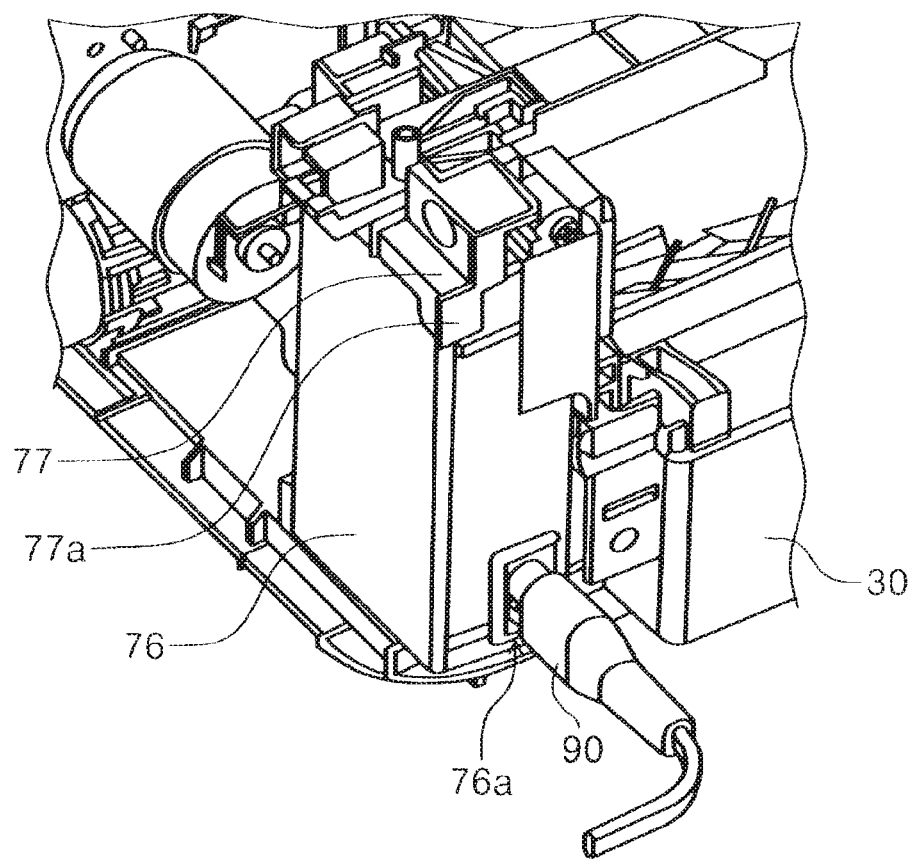
FIG. 19 is a view illustrating that a housing and a reading mechanism are removed from a configuration shown in FIG. 17.

Next, a description will be given of the restriction on the liquid flowing into the power supply unit 76 through the first boundary 57A. As shown in FIG. 17, a plug insertion part 76a into which a connection plug 90 of an AC adapter (not shown) is inserted is provided on the rear face of the apparatus main body 2. As shown in FIGS. 18 and 19, the plug insertion part 76a is provided on a side face of the power supply unit 76 on the −Y side.

As shown in FIG. 6, the power supply unit 76 is provided at a position overlapping the first boundary 57A in plan view. Accordingly, although the liquid entering through the first boundary 57A basically flows into the first recess 58A, the liquid may flow into the power supply unit 76 on the −Y direction end of the first boundary 57A without flowing into the first recess 58A. Therefore, as shown in FIGS. 18 and 19, a liquid guiding member 77 for guiding the liquid entering through the first boundary 57A in a direction away from the power supply unit 76. The liquid guiding member 77 regulates the liquid entering through the first boundary 57A so as not to flow into the power supply unit 76. Accordingly, it is possible to prevent the liquid entering through the first boundary 57A from flowing into the power supply unit 76.

Further, the liquid guiding member 77 has a wall 77a that regulates a flow of liquid to the plug insertion part 76a. Accordingly, it is possible to prevent liquid from flowing into the plug insertion part 76a.

Further, the first recess 58A is formed to extend along the first boundary 57A, the second recess 58B is formed to extend along the second boundary 57B, and the third recess 58C is formed to extend along the third boundary 57C.

The present disclosure is not limited to the aforementioned embodiments. Various modifications can be made within the scope of the disclosure defined by the appended claims, and such modifications should be included in the scope of the disclosure.

What is claimed is:

1. A recording apparatus comprising:
   an apparatus main body having a recording unit that performs recording onto a recording medium, the apparatus main body also having an upper surface that includes a first cover that opens to expose the recording unit; and
   a unit body which is provided on an upper side of the apparatus main body, a top surface of the unit body includes a second lid and has a smaller top surface area than a top surface area of the upper surface of the apparatus main body such that even when the second lid of the unit body is in a closed position, a portion of the upper surface of the apparatus main body remains exposed, the second lid of the unit body forming a plurality of upwardly open gaps between the unit body and the portion of the upper surface of the apparatus main body that remains exposed when the second lid of the unit body is in the closed position, so that liquid that is spilled on the unit body or on the upper surface of the apparatus main body that is exposed when the second lid of the unit body is in the closed position flows into one or more of the plurality of upwardly open gaps, wherein a recess is formed for each of the plurality of upwardly open gaps so as to receive spilled liquid entering through a corresponding gap, wherein the unit body is a document reading unit having a reading section configured to read a document and a document transport section configured to transport the document to the reading section, wherein the plurality of upwardly open gaps include:
a first gap located on a first side in a direction intersecting a document transport direction of the document transport section relative to the unit body, the first gap extending in the document transport direction;
a second gap located on a second side that opposite to the first side in the document transport direction relative to the unit body, the second gap extending in the document transport direction;
a third gap located upstream in the document transport direction relative to the unit body, the third gap extending in a direction intersecting the document transport direction,
a first recess corresponding to the first gap,
a second recess corresponding to the second gap, and
a third recess corresponding to the third gap, wherein a hole for allowing liquid to drop down is formed in the third recess, wherein the recording unit is formed of a recording head that performs recording by ejecting ink onto a recording medium, wherein the apparatus main body includes a support member that supports a recording medium at a position facing the recording unit, wherein the support member has an ink receiver that receives ink ejected from the recording head, and wherein the ink receiver receives liquid that drops from the hole provided in the third recess.

2. The recording apparatus according to claim 1, wherein a bottom of the third recess includes an inclined surface extending downward toward the hole.

3. The recording apparatus according to claim 1, wherein the ink receiver has an ink absorber that absorbs ink.

4. A recording apparatus comprising:
an apparatus main body having a recording unit that performs recording onto a recording medium, the apparatus main body also having an upper surface that includes a first cover that opens to expose the recording unit; and
a unit body which is provided on an upper side of the apparatus main body, a top surface of the unit body includes a second lid and has a smaller top surface area than a top surface area of the upper surface of the apparatus main body such that even when the second lid of the unit body is in a closed position, a portion of the upper surface of the apparatus main body remains exposed, the second lid of the unit body forming a plurality of upwardly open gaps between the unit body and the portion of the upper surface of the apparatus main body that remains exposed when the second lid of the unit body is in the closed position, so that liquid that is spilled on the unit body or on the upper surface of the apparatus main body that is exposed when the second lid of the unit body is in the closed position flows into one or more of the plurality of upwardly open gaps, wherein a recess is formed for each of the plurality of upwardly open gaps so as to receive spilled liquid entering through a corresponding gap, wherein the unit body is a document reading unit having a reading section configured to read a document and a document transport section configured to transport the document to the reading section, wherein the plurality of upwardly open gaps include:
a first gap located on a first side in a direction intersecting a document transport direction of the document transport section relative to the unit body, the first gap extending in the document transport direction;
a second gap located on a second side that opposite to the first side in the document transport direction relative to the unit body, the second gap extending in the document transport direction;
a third gap located upstream in the document transport direction relative to the unit body, the third gap extending in a direction intersecting the document transport direction,
a first recess corresponding to the first gap,
a second recess corresponding to the second gap, and
a third recess that corresponding to the third gap, wherein a hole for allowing liquid to drop down is formed in the third recess, wherein the apparatus main body includes a liquid receiver that receives liquid, wherein a hole for allowing liquid to drop down is formed in a region where the second gap and the third gap intersect each other, and the liquid receiver is provided under the hole, and wherein a circuit board is provided under the liquid receiver.

5. The recording apparatus according to claim 1, wherein the apparatus main body includes the recording unit, and a carriage that moves in a direction intersecting the document transport direction,
the carriage has a home position at an end of a movable region,
the recording unit is formed of a recording head that performs recording by ejecting ink onto a recording medium, an ink absorber that absorbs ink is provided at the home position of the carriage, and
the ink absorber is located under the hole.

6. The recording apparatus according to claim 1, wherein liquid entering through the gap is guided to a liquid receiver that receives liquid through the hole.

7. The recording apparatus according to claim 6, wherein the liquid receiver has a liquid absorber that absorbs liquid.

8. The recording apparatus according to claim 1, further comprising:
a power supply unit provided at a position that overlaps the first gap in plan view; and
a liquid guiding member configured to guide liquid entering from the first gap in a direction away from the power supply unit.

9. The recording apparatus according to claim 8, wherein the power supply unit includes a plug insertion part, and the liquid guiding member includes a wall that regulates a flow of liquid to the plug insertion part.

10. The recording apparatus according to claim 1, wherein the first recess is formed to extend along the first gap, the second recess is formed to extend along the second gap, and the third recess is formed to extend along the third gap.

* * * * *